(12) United States Patent
Sheng et al.

(10) Patent No.: US 12,260,258 B2
(45) Date of Patent: Mar. 25, 2025

(54) DISTRIBUTED SYSTEM WORKLOAD MANAGEMENT VIA NODE AUTONOMY

(71) Applicant: International Business Machines Corporation, Armonk, NY (US)

(72) Inventors: Hao Sheng, Ningbo (CN); Wen Wang, Beijing (CN); Rong Fu, Ningbo (CN); Jian Dong Yin, Beijing (CN); Chuan Qing Yu, Beijing (CN); Kang Zhang, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 845 days.

(21) Appl. No.: 17/466,262

(22) Filed: Sep. 3, 2021

(65) Prior Publication Data
US 2023/0072962 A1   Mar. 9, 2023

(51) Int. Cl.
*G06F 9/50* (2006.01)
(52) U.S. Cl.
CPC .................. *G06F 9/505* (2013.01)
(58) Field of Classification Search
CPC ....... G06F 39/45533; G06F 2009/4557; G06F 9/505; G06F 2209/5019; G06F 2209/5021; G06F 2209/503; G06Q 10/0633
See application file for complete search history.

(56) References Cited

U.S. PATENT DOCUMENTS

| | | | |
|---|---|---|---|
| 9,530,110 B2 | 12/2016 | Allen | |
| 2013/0179881 A1* | 7/2013 | Calder | G06F 9/5072 718/1 |
| 2013/0239111 A1* | 9/2013 | Bingham | G06F 11/3409 718/1 |
| 2019/0278622 A1* | 9/2019 | Calder | H04L 47/70 |
| 2020/0050487 A1* | 2/2020 | Garla | G06F 9/5061 |
| 2021/0328927 A1* | 10/2021 | Schultz | H04L 63/02 |

FOREIGN PATENT DOCUMENTS

| | | |
|---|---|---|
| CN | 102394807 B | 3/2015 |
| CN | 112035215 A | 12/2020 |
| CN | 112241342 A | 1/2021 |

OTHER PUBLICATIONS

Mell, et al., "The NIST Definition of Cloud Computing," Recommendations of the National Institute of Standards and Technology, U.S. Department of Commerce, Special Publication 800-145, Sep. 2011, 7 pgs.

* cited by examiner

*Primary Examiner* — Brian W Wathen
(74) *Attorney, Agent, or Firm* — Heather Johnston (57) ABSTRACT

A system may include a memory and a processor in communication with the memory. The processor may be configured to perform operations. The operations may include calculating a priority factor with a node autonomous center in a node and computing a node service capability with the node autonomous center. The operations may further include selecting, with the node autonomous center, a task based on the priority factor and the node service capability. The operations may further include directing the task to the node.

20 Claims, 8 Drawing Sheets

DISTRIBUTED SYSTEM WORKLOAD MANAGEMENT VIA NODE AUTONOMY

BACKGROUND

The present disclosure relates to distributed system workload management, and, more specifically, to workload scheduling and dispatching in distributed systems.

Workload scheduling and workload distribution are common functions in the computer field, including in distributed systems. Distributed systems may include, for example, open-source container systems. Open-source containers offer adaptive load balancing, service registration, deployment, operation, resource scheduling, and capacity scaling. Centralized modules are used for workload scheduling and distribution.

SUMMARY

Embodiments of the present disclosure include a system, method, and computer program product for node-level autonomous workload scheduling and workload dispatching in distributed systems.

A system may include a memory and a processor in communication with the memory. The processor may be configured to perform operations. The operations may include calculating a priority factor with a node autonomous center in a node and computing a node service capability with the node autonomous center. The operations may further include selecting, with the node autonomous center, a task based on the priority factor and the node service capability. The operations may further include directing the task to the node.

The above summary is not intended to describe each illustrated embodiment or every implement of the disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to distributed system workload management, and, more specifically, to workload scheduling and dispatching in distributed systems.

Centralized modules are often used for workload scheduling and distribution. In some systems, an API gateway acts as a reverse proxy to accept external requests and forward them to back-end services (e.g., clusters, nodes, and/or pods); forwarding may be based on strategies such as polling or an algorithm, or it may be based on request number or average response time. In some systems, automatic scaling in open-source container clusters (e.g., Kubernetes® clusters) can automatically scaling up and/or scale down pod replicas depending on the load; in a scaling up scenario, a control center may assign a new pod to one of the cluster nodes based on the current resource usage or some static labels.

Workload scheduling and distribution functions are mostly handled by a centralized module; to ensure scheduling performance, the system usually uses simple rules, such as polling and/or random allocation, pre-defined static tags, or based on certain type of resource usage. Such a mechanism may result in a high computational load on the centralized module due to the central unit taking the responsibilities of both service provider capacity or priority calculation and task scheduling. Further, to ensure the performance, systems commonly use simple, static rules such as pre-defined tags, polling, random allocation, assignment according to type of resource usage, and the like. Such systems may also apply the same rules to every node; such a mechanism is not flexible, and the inflexibility may be detrimental if the factors considered are not comprehensive.

The present disclosure addresses scheduling and dispatching workloads based on node autonomy in distributed systems. In some embodiments of the present disclosure, a logic label-based decoupling mechanism may be used such that a service provider capacity or priority calculation may be transferred from a centralized module to individual nodes; each node outputs its service capacity or priority in the form of logical label. In some embodiments of the present disclosure, a node autonomy mechanism may be used such that each node dynamically calculates its service capability or priority according to its current (e.g., real-time) status. In some embodiments of the present disclosure, a centralized scheduling module may execute task scheduling based on customized label rules or algorithms.

Figure 1:
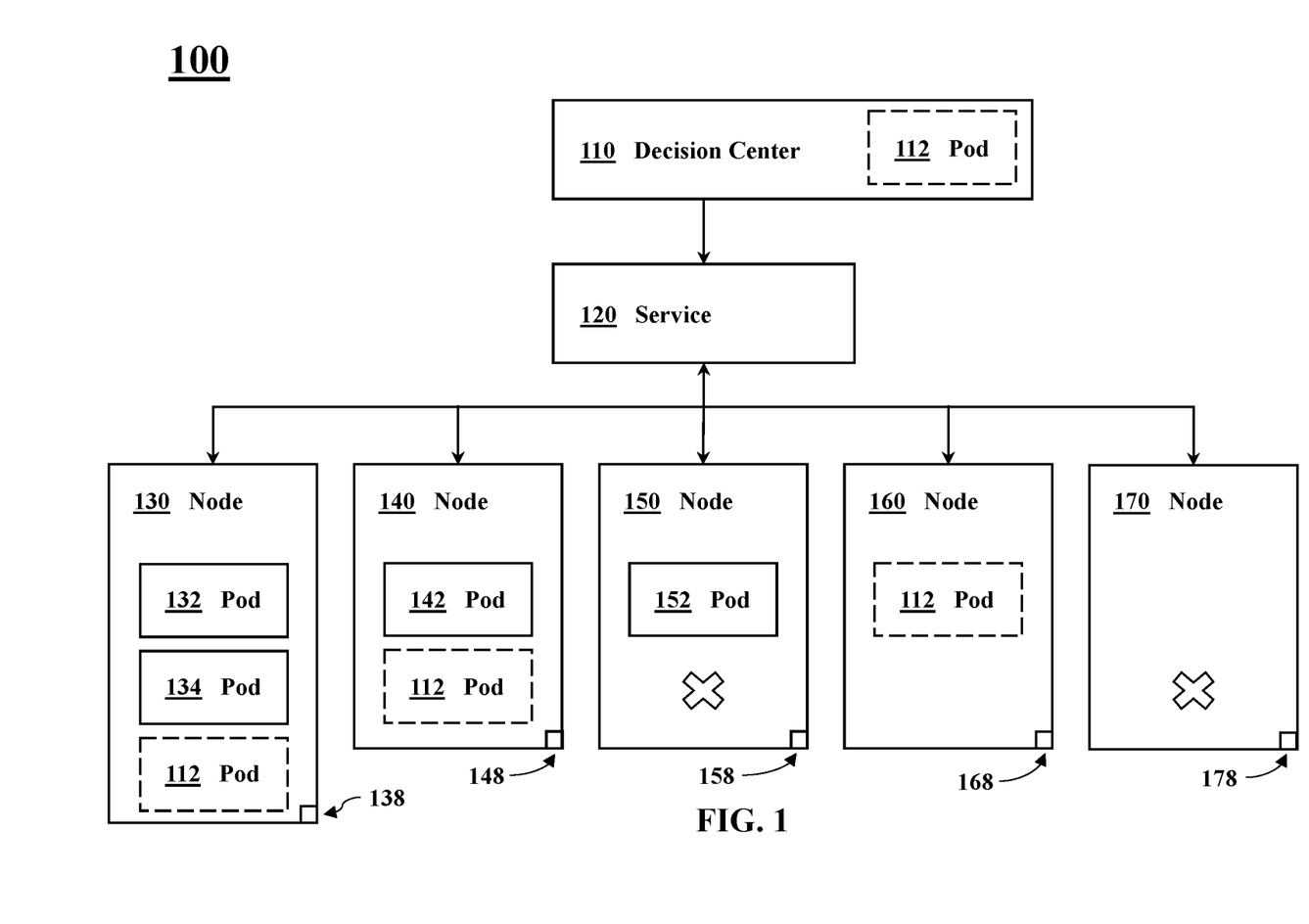
FIG. 1 depicts workload management system in accordance with some embodiments of the present disclosure.

FIG. 1 depicts workload management system 100 in accordance with some embodiments of the present disclosure. The workload management system 100 includes a decision center 110 in communication with a service 120. The service 120 is in communication with several nodes 130, 140, 150, 160, and 170.

The service 120 may maintain labels for each of the nodes 130, 140, 150, 160, and 170. The labels maintained by the service 120 may identify each node 130, 140, 150, 160, and 170 and qualities of each node 130, 140, 150, 160, and 170. The qualities may include, for example, the overall capabilities of a node 130, 140, 150, 160, and 170, the current node service capabilities, a node status (e.g., working properly or pending reset), and the like.

The overall capabilities of a node 130, 140, 150, 160, or 170 may include the computation power, memory, disk space, network bandwidth, and the like of an individual node 130, 140, 150, 160, or 170 without a workload. A current node service capability may be referred to as a service capability, a current service capability, a node service capability, and similar. A node service capability reflects the current availability of computation power, memory, disk space, network bandwidth, and the like within an individual node 130, 140, 150, 160, or 170 given the current workload of the node 130, 140, 150, 160, and 170. The node service capability may be expressed as the current activities of a node 130, 140, 150, 160, or 170 subtracted from the overall capabilities of that node 130, 140, 150, 160, or 170. The node service capability may change over time, and the labels maintained by the service 120 may be updated by the node 130, 140, 150, 160, or 170 via an autonomous center 138, 148, 158, 168, or 178 on the respective node 130, 140, 150, 160, or 170 to reflect the change.

Each node 130, 140, 150, 160, and 170 may have an autonomous center 138, 148, 158, 168, and 178 to generate and dynamically update their own labels within the service 120. The autonomous centers 138, 148, 158, 168, and 178 may evaluate the capabilities and usage of their respective nodes 130, 140, 150, 160, and 170 to generate assessments of their respective nodes 130, 140, 150, 160, and 170. The assessments of a node 130, 140, 150, 160, or 170 may include its status (e.g., working properly or pending reset), current service capability, and the like. The assessments may be or include information included in the labels maintained in the service 120. The assessments may assist the service 120 in selecting a node 130, 140, 150, 160, or 170 for a task. The labels may reflect the node service capability of a node 130, 140, 150, 160, or 170 by, for example, including the assessment of each node 130, 140, 150, 160, or 170 including the usage and availability of an individual node 130, 140, 150, 160, or 170 with respect to computation power, memory, disk space, network bandwidth, and the like.

Nodes 130, 140, 150, 160, and 170 may update their own labels periodically, in real time, or some combination thereof. Periodic updates may occur, for example, once every three seconds or once per hour. Real time updates may happen any time a change occurs within the impacted node 130, 140, 150, 160, or 170, such as when the workload of the node 130, 140, 150, 160, or 170 changes. Some combination thereof may be, for example, a node 130, 140, 150, 160, or 170 updating after any major change (e.g., deployment, or after completing all workload tasks) and then periodically updating thereafter.

Each node 130, 140, 150, 160, and 170 may update their labels concurrently, at staggered times, independently, or some combination thereof. Concurrent updates (which may be referred to as simultaneous updates or updates occurring at the same time across multiple nodes 130, 140, 150, 160, and 170) may include, for example, all of the nodes 130, 140, 150, 160, and 170 updating their labels at the start of a new minute. Staggered updates may include one node 130 updating its label at three seconds after the start of the minute and another node 140 updating its label at five seconds after the start of the minute. Independent updates may include real-time updates regardless of the activity of other nodes 130, 140, 150, 160, and 170, such as each node 130, 140, 150, 160, and 170 automatically updating its own label when a change of individual node 130, 140, 150, 160, and 170 usage occurs. An example of a combination of these timing mechanisms may include one node 150 updating at the turn of the minute, another node 160 updating ten seconds after the turn of the minute, and yet another node 170 updating in real time based on changes within that node 170.

When the decision center 110 has a new pod 112 ready for deployment, the decision center 110 may communicate this information to the service 120. The service 120 may identify which node 130, 140, 150, 160, or 170 to deploy the new pod 112 based on the dynamic labels updated by the autonomous centers 138, 148, 158, 168, and 178. For example, if a node 130 already hosts two pods 132 and 134 using 80% of its processing power and 60% of its memory, that node 130 has a current service capability of 20% of its processing power and 40% of its memory; the label of the node 130 (as maintained by the autonomous center 138) may reflect this current service capability, the service 120 may identify that these conditions are acceptable for deploying the new pod 112, and the service 120 may deploy the new pod 112 to that node 130 based on the current service capability information on the label.

In another example, a node 140 may be hosting one pod 142 that uses 85% of its processing power and 65% of its memory, resulting in current service capability of 15% processing power and 35% memory; the service 120 may identify that these conditions are acceptable for deploying the new pod 112, and the service 120 may deploy the new pod 112 to that node 140 based on the current service capability information on the label.

In another example, a node 150 may currently already host one pod 152 that uses 90% of its processing power and 90% of its memory, resulting in 10% processing power availability and 10% memory availability. Given a threshold of 15% service capability for deploying the new pod 112, the service 120 may identify that these conditions are unacceptable for deploying the new pod 112. As the threshold (here, 15% current service capability for the new pod) is not met, the service 120 may not deploy the new pod 112 to that node 150 based on the limited current service capability information on the label; the service 120 may instead identify a different host (e.g., node 130 or node 140) for the new pod 112 based on the other dynamic labels it maintains. In FIG. 1, unacceptable conditions for deployment within the node 150 are indicated with an "X" symbol in the node 150.

In another example, a node 160 may not currently host any pods but instead has other processes using 60% of its processing power and 40% of its memory resulting in 40% processing power availability and 60% memory availability; the service 120 may identify these conditions as acceptable for deploying the new pod 112, and the service 120 may deploy the new pod 112 to that node 160 based on the current service capability information on the label of the node 160.

In another example, a node 170 may not currently host any pods but instead has other processes using 70% of its processing power and 80% of its memory, resulting in 30% processing power availability and 20% memory availability. If the new pod 112 requires 25% memory availability for deployment, the service 120 may identify the conditions of the node 170 are unacceptable for deploying the new pod 112 and opt to not deploy the new pod 112 to that node 170 based on the limited current service capability information on the label; in FIG. 1, unacceptable conditions for deployment within the node 170 are indicated with an "X" symbol in the node 170. The service 120 may instead identify a different host (e.g., node 130, node 140, or node 160) for the new pod 112 based on the other labels dynamically maintained in its database.

According to some aspects of the present disclosure, the workload of a decision center 110 may be reduced by removing the responsibility and workload of identifying a proper host (e.g., by its available resources) for deploying a workload. The task of identifying a proper host may be moved to one or more clusters, nodes, pods, or other distributed system components.

For example, the present disclosure considers that the service 120 may maintain labels for each individual pod 132, 134, 142, and 152 in each of the nodes 130, 140, 150, 160, and 170 to deploy a specific task to a specific pod 132, 134, 142, and 152 based on the label of the pod 132, 134, 142, and 152. Each pod 132, 134, 142, and 152 may include an autonomous center to generate and dynamically update their own labels; the pod autonomous centers may operate similarly to the node autonomous centers 138, 148, 158, 168, and 178. Including autonomous centers within each pod 132, 134, 142, and 152 may enable analysis with finer granularity to assess the ability of each individual pod 132, 134, 142, and 152 to perform a specific task. Pods 132, 134, 142, and 152 may generate and update their own labels based on their individual pod service capabilities such that the service 120 may assign a workload directly to a pod 132, 134, 142, or 152 based on its individual pod service capacity (e.g., workload and available resources).

Figure 2:
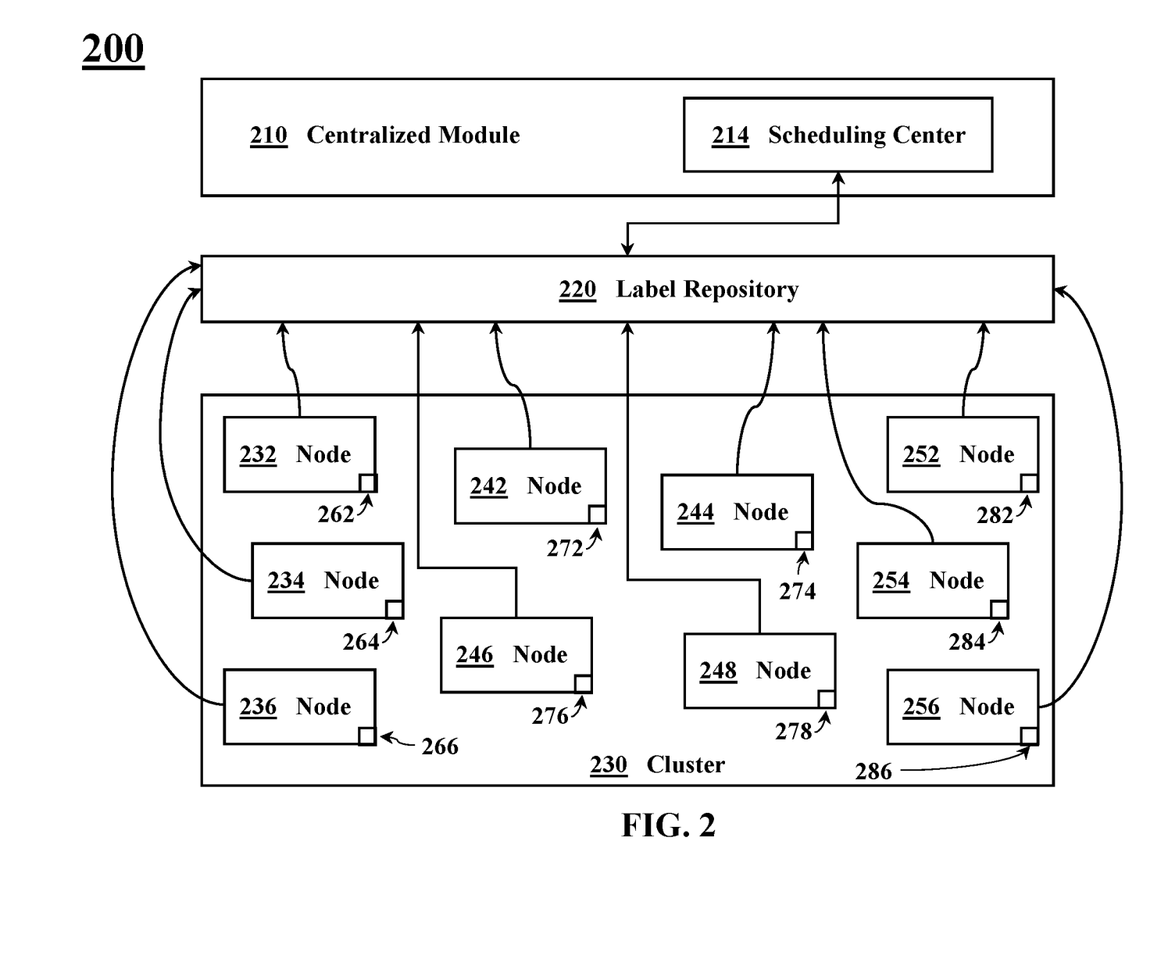
FIG. 2 illustrates a distributed system using workload management via node autonomy in accordance with some embodiments of the present disclosure.

In some embodiments of the present disclosure, a label repository (which may also be referred to as a node address label intermediary) may be used to store labels and facilitate communication between a cluster and a centralized module. A tag-based mechanism such as this may reduce the computation load of the centralized scheduling and distribution module. Different types of scheduling and distribution systems can flexibly select label types and specify label computation rules. The label computation logic and the criteria for judging the priority of service capabilities may be transferred from centralized module to individual nodes. FIG. 2 illustrates such a distributed system 200 using workload management via node autonomy in accordance with some embodiments of the present disclosure. The distributed system 200 includes a centralized module 210 communicating with a cluster 230 via a label repository 220.

The centralized module 210 may include a scheduling center 214. The centralized module 210 may obtain workloads (e.g., tasks or pods to be deployed) and submit them to the scheduling center 214 for deployment. The scheduling center 214 may communicate with a label repository 220 to deploy the workload based on the data contained in the label repository 220.

The label repository 220 may also be referred to as an intermediary, a container for node data, a node address label intermediary, or similar. The label repository 220 may be an intermediary for communications between the scheduling center 214 of a centralized module 210 and the nodes 232-256 of a cluster 230. The label repository 220 may maintain the labels (which may also be referred to as tags or logic labels) for the nodes 232-256. The nodes 232-256 may have autonomous node centers 262-286 for generating the logic labels, submitting the logic labels to the label repository 220, and updating the logic labels.

The labels stored in the label repository 220 may contain data regarding the service capabilities of their respective nodes 232-256. The labels may include information about the nodes 232-236 such as, for example, the overall computing power, the available computing power, the overall memory, the available memory, predictions (e.g., when certain resources will become available and when certain resources are expected to be unavailable), priority, and the like. In some embodiments, data in labels may be saved as scores (e.g., a priority may have a normalized value between one and one hundred).

The labels stored in the label repository 220 may consider one or more factors. For example, a label may contain information about both available processing power as a first factor and memory as a second factor. Additional factors may also be used such as, for example, total processing power and/or when additional memory will become available. A label may also include a priority which may be a weighted score about node capabilities.

Information in the labels may be generated and updated by the autonomous node centers 262-286. The autonomous node centers 262-286 may calculate a priority factor for, compute the service capability of, and/or predict one or more future capabilities of their respective nodes 232-256. The autonomous node centers 262-286 may predict usage of their respective nodes 232-256 based on historical data. The autonomous node centers 262-286 may use one or more prediction methods such as, for example, a linear regression model, an adaptive neuro-fuzzy inference systems model, a non-linear autoregressive network with exogenous inputs model, and the like. The autonomous node centers 262-286 may calculate a priority score and/or normalize a priority score. The autonomous node centers 262-286 may calculate and/or normalize the priority score according to any mechanism(s) used in the art.

The autonomous node centers 262-286 may update the labels stored in the label repository 220 in real time (e.g., when a change occurs), periodically (e.g., once per second), or some combination thereof. The update type (e.g., whether in real time or periodic) and/or the frequency of the updates may depend on system capabilities and requirements.

In some embodiments of the present disclosure, decoupling the label calculation from the centralized module 210 to reduce the computational demands thereon may come in different forms. Other components of the distributed system may calculate such labels. For example, the present disclosure considers that the cluster 230 may have a cluster autonomous center (not shown) to generate and update labels. For example, in some embodiments, a cluster autonomous center may be used to produce node logic labels for each node 232-286; the cluster autonomous center may submit the node logic labels to the label repository 220 and dynamically update the node logic labels periodically, in real time, or some combination thereof. A cluster autonomous center may update the logic labels for each node 232-256 simultaneously, at staggered times, independently, or some combination thereof.

A system in accordance with the present disclosure may include a memory and a processor in communication with the memory. The processor may be configured to perform operations. The operations may include calculating a priority factor with a node autonomous center 262 in a node 232 and computing a node service capability with the node autonomous center 262. The operations may further include selecting, with the node autonomous center 262, a task based on the priority factor and the node service capability. The operations may further include directing the task to the node 232.

In some embodiments, the operations may include communicating, by the node 232, a communication with a centralized module 210, wherein the centralized module 210 provides the task to the node 232 upon receipt of direction from the node 232. In some embodiments, the communication may be communicated between the node 232 and the centralized module 210 via a label repository 220.

In some embodiments, the operations may further include identifying a task type wherein the priority factor is computed based on the task type. Task types may include, for example, jobs (e.g., non-parallel, parallel with a fixed completion count, or parallel with a work queue), administrative tasks, configuration tasks, application running, application data injection, monitoring/logging/debugging, securing traffic, managing a system or system components, networking, scheduling, and the like.

In some embodiments, the operations may further include choosing, dynamically, at least one input for calculating the priority factor. The priority factor may, for example, include current computation power availability in a first calculation and a predicted future computation power availability in a second calculation. Input selection may be made in real time, periodically, or some combination thereof.

Service capability of a node 232 may fluctuate over time. In some embodiments, a system in accordance with the present disclosure may predict a future node service capability with the node autonomous center of one or more nodes 232-256. The future node service capability may be a component of the node service capability; for example, the node service compatibility may include a current capability (what a node is capable of at the present time given its presently allotted resources and workload) and a future capability (what a node is expected to be capable of at a forthcoming time given the expected allotment of resources and workload).

Some embodiments of the present disclosure may include analyzing node data using its node autonomous center to predict the future node service capability. Autonomous centers 262-286 may analyze node data including current workload, current resources (e.g., computation power, memory, disk space, network bandwidth, and the like), expected workload (e.g., accounting for increased workload brought about by adding new tasks to the nodes 232-256 and accounting for decreased workload upon task completions), expected resources, and the like. The autonomous centers 262-286 may analyze node data to predict future service capabilities of their respective nodes 232-256. In some embodiments, information concerning the future node service capability may be included in the logic label stored in the label repository 220.

The scheduling center 214 may use the future node service capability information, for example, to identify when a node 232 is predicted to become available for an anticipated workload. In some embodiments, the autonomous centers 262 may identify peak activity times for their respective nodes 232 by analyzing the node data; such information may be included in the logic label, and the scheduling center 214 may use the information to schedule certain tasks during off-peak hours to preserve workload availability during peak hours.

Figure 3:
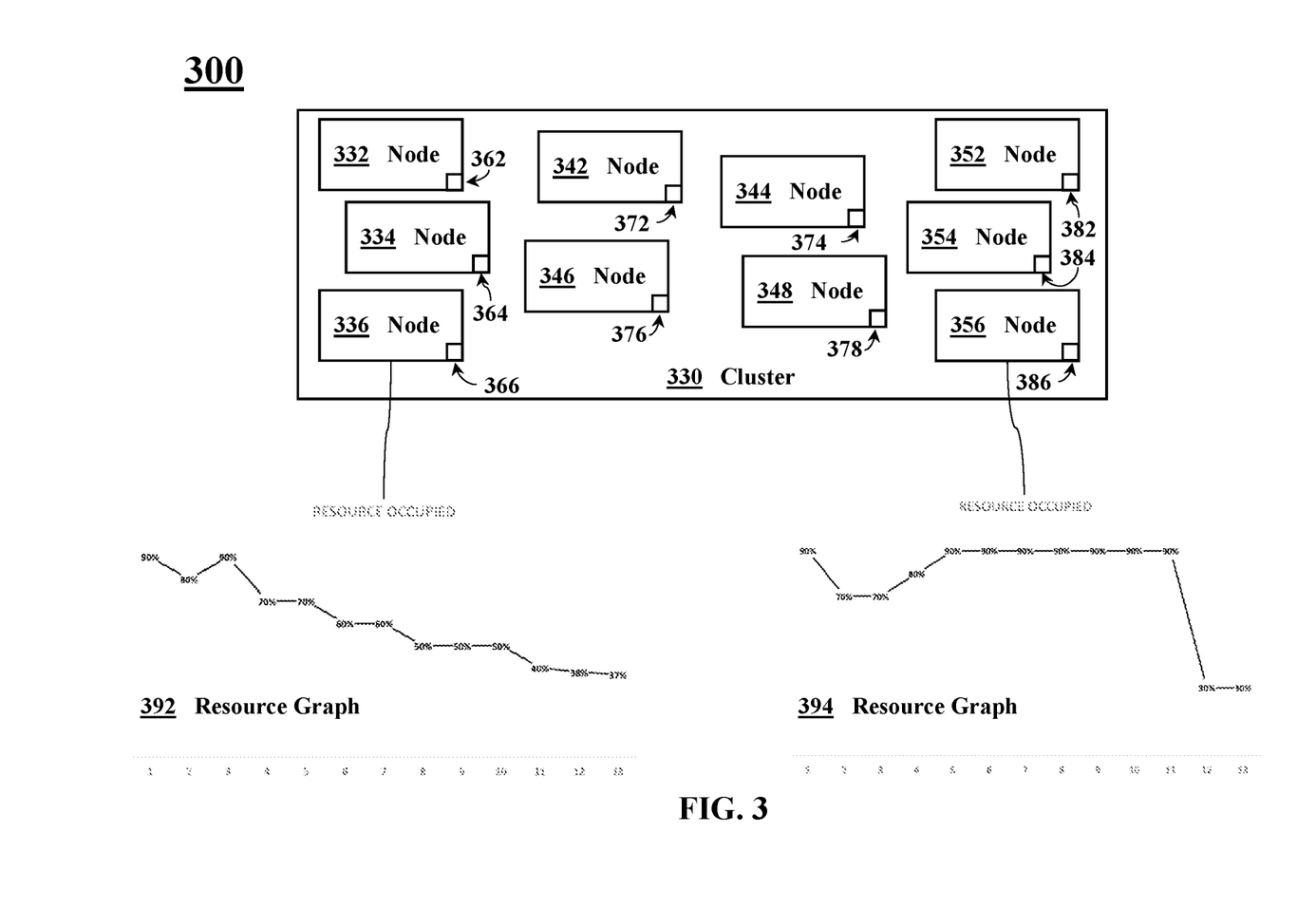
FIG. 3 depicts service capability of a distributed system using workload management via node autonomy in accordance with some embodiments of the present disclosure.

FIG. 3 depicts the service capability of a distributed system 300 using node autonomy workload management in accordance with some embodiments of the present disclosure. The distributed system 300 includes a cluster 330 with nodes 332-356. The resources occupied by two of the nodes 336 and 356 are shown as resource graphs 392 and 394.

The nodes 332-356 have autonomous centers 362-386 for scheduling and distribution of node resources. The computing units of the autonomous centers 362-386 may dynamically select the priority calculation factors based the task types. Priority calculation factors may include, for example, processing power, memory, disk, network, and other factors. Each autonomous center 362-386 may dynamically calculate the current and future service capabilities of their respective nodes 332-356 based on one or more data analysis and prediction methods.

The resource graphs 392 and 394 depict the resource use of their respective nodes 336 and 356 over time. The resource graphs 392 and 394 may refer to the total resources of a node (e.g., a weighted score including computing power, memory, network bandwidth, and disk space), a specific combination of resources (e.g., disk space and memory), or a particular resource (e.g., computing power). The information shown in the resource graphs 392 and 394 may be contained, in whole or in part, in labels stored in a label repository. The resource graphs 392 and 394 depict the resources occupied within their respective nodes 336 and 356 as calculated by the respective autonomous centers 366 and 386 over time; various time frames may be used (e.g., over the course of an entire lifecycle of a node, or in weekly increments) in accordance with the present disclosure.

Figure 4:
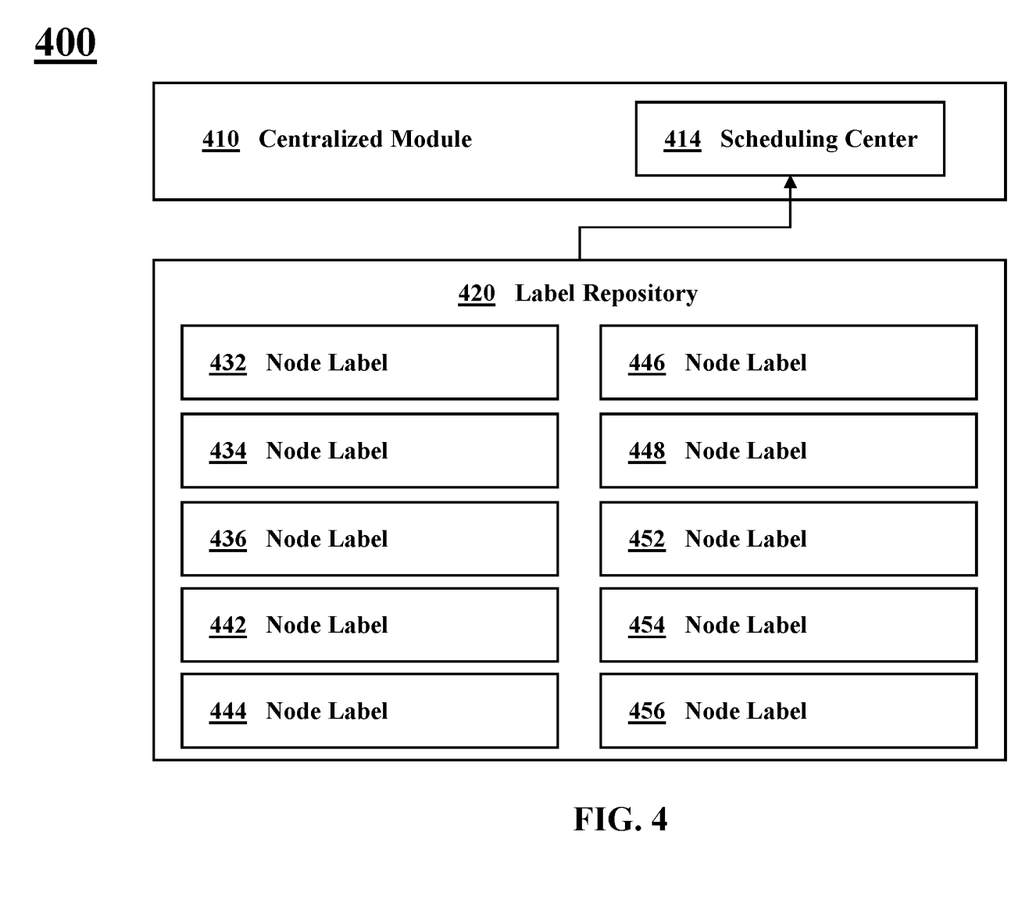
FIG. 4 illustrates labeling component of a distributed system using workload management via node autonomy in accordance with some embodiments of the present disclosure.

FIG. 4 illustrates labeling component of a distributed system 400 using workload management via node autonomy in accordance with some embodiments of the present disclosure. The distributed system 400 includes a centralized module 410 and a label repository 420 communicating therewith. The centralized module 410 includes a scheduling center 414. The label repository 420 contains the node labels 432-456 for the nodes in the system.

A dynamic scheduling algorithm may be used based on the logical tags. For example, a label repository 420 (which may be referred to as a priority storage center, a service capacity storage center, or label intermediary) may by introduced. Each node may report its node label 432-456 (which may be referred to as logic labels) to the label repository 420. Node labels 432-456 may include node data including, for example, current node service capability, future node service capability, and node address information.

The scheduling center 414 (which may conduct distribution and scheduling) in centralized module 410 may not need to poll the nodes to obtain the labels and address information because it may instead pull the information from the node labels 432-456 stored in the label repository 420. The scheduling center 414 may flexibly choose one or more scheduling algorithms according to the type and/or complexity of the specific task. For example, the scheduling center 414 may choose a scheduling algorithm according to the priority sorting rules based on a single label, a grid search mechanism based on multi-label combination, a decision tree mechanism based on tag priority combination, or the like.

Figure 5:
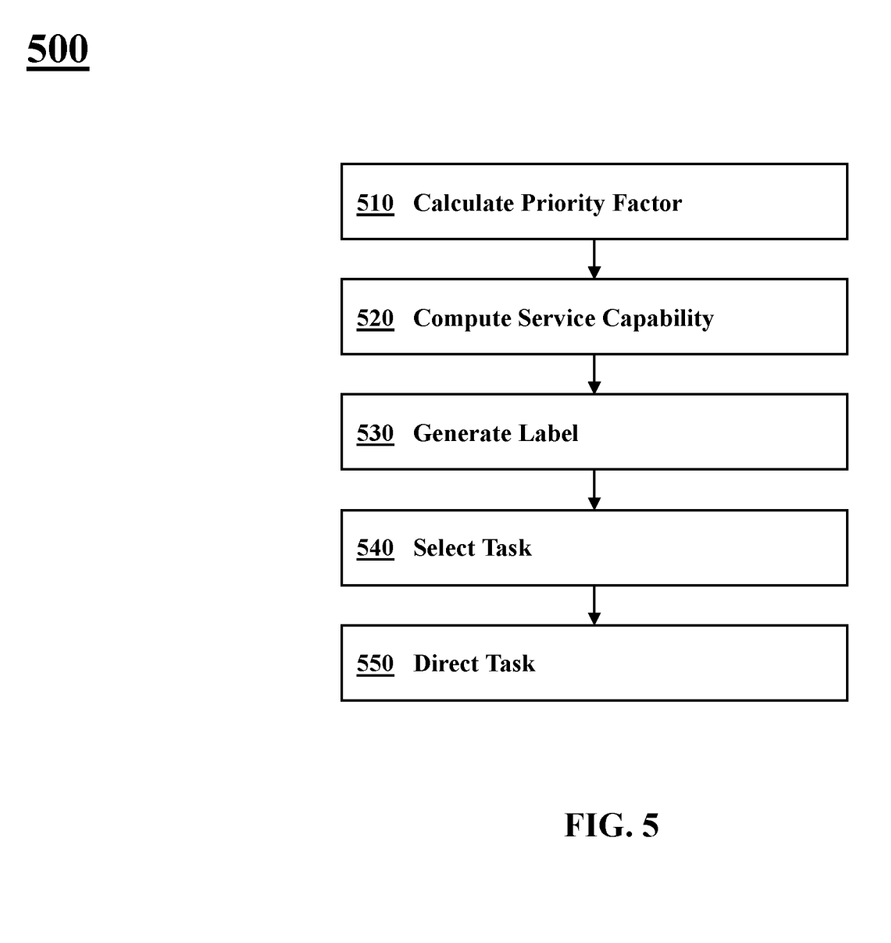
FIG. 5 depicts a method for workload management via node autonomy in distributed systems in accordance with some embodiments of the present disclosure.

FIG. 5 depicts a method 500 for workload management via node autonomy in distributed systems in accordance with some embodiments of the present disclosure. The method may include calculating 510 a priority factor with a node autonomous center in a node. The method may include the node autonomous center computing 520 a node service capability. The service capability may include factors such as, for example, the processing power, memory, disk space, network properties, and other node properties. The method may include the node autonomous center generating 530 a node label. The node label may indicate node information such as, for example, the node address and the node service capability. The method may further include the node autonomous center selecting 540 a task based on the priority factor and the node service capability and directing 550 the task to the node.

In some embodiments, the method may further include identifying a task type wherein the priority factor is computed based on the task type. In some embodiments, the method may further include choosing, dynamically, at least one input for calculating the priority factor.

In some embodiments, the method may further include predicting a future node service capability with the node autonomous center; the future node service capability may be a component of the node service capability. Some embodiments may further include analyzing node data with the node autonomous center to predict the future node service capability.

In some embodiments, the method may further include communicating, by the node, a communication with a centralized module, wherein the centralized module provides the task to the node upon receipt of direction from the node. In some embodiments, the communication may be communicated between the node and the centralized module via a label repository.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment currently known or that which may be later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but the consumer has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software which may include operating systems and applications. The consumer does not manage or control the underlying cloud infrastructure but has control over operating systems, storage, and deployed applications, and the consumer possibly has limited control of select networking components (e.g., host firewalls).

Deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and/or compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
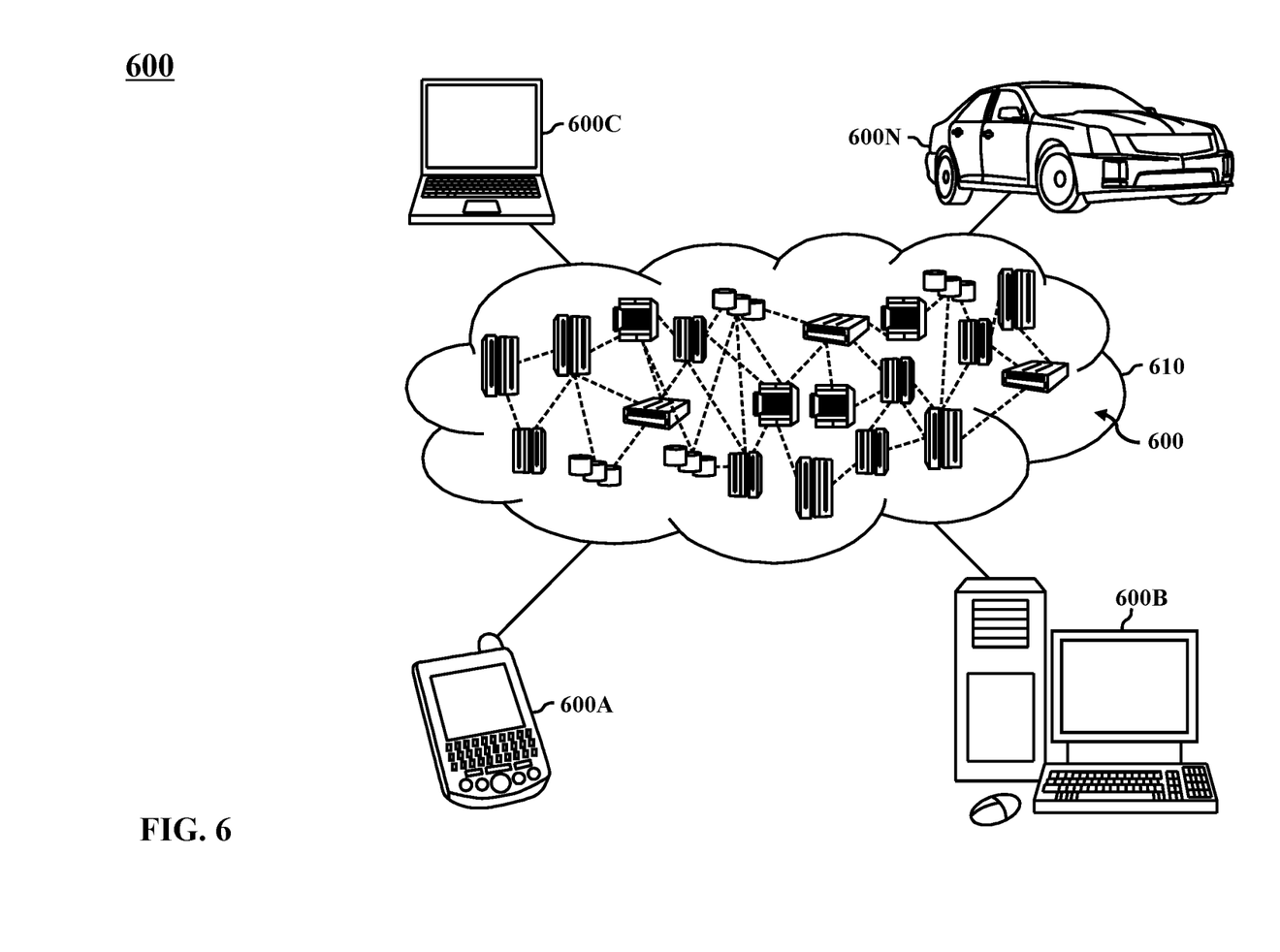
FIG. 6 illustrates a cloud computing environment, in accordance with embodiments of the present disclosure.

FIG. 6 illustrates a cloud computing environment 610 in accordance with embodiments of the present disclosure. As shown, cloud computing environment 610 includes one or more cloud computing nodes 600 with which local computing devices used by cloud consumers such as, for example, personal digital assistant (PDA) or cellular telephone 600A, desktop computer 600B, laptop computer 600C, and/or automobile computer system 600N may communicate. Nodes 600 may communicate with one another. They may be grouped (not shown) physically or virtually, in one or more networks, such as private, community, public, or hybrid clouds as described hereinabove, or a combination thereof.

This allows cloud computing environment 610 to offer infrastructure, platforms, and/or software as services for which a cloud consumer does not need to maintain resources on a local computing device. It is understood that the types of computing devices 600A-N shown in FIG. 6 are intended to be illustrative only and that computing nodes 600 and cloud computing environment 610 can communicate with any type of computerized device over any type of network and/or network addressable connection (e.g., using a web browser).

Figure 7:
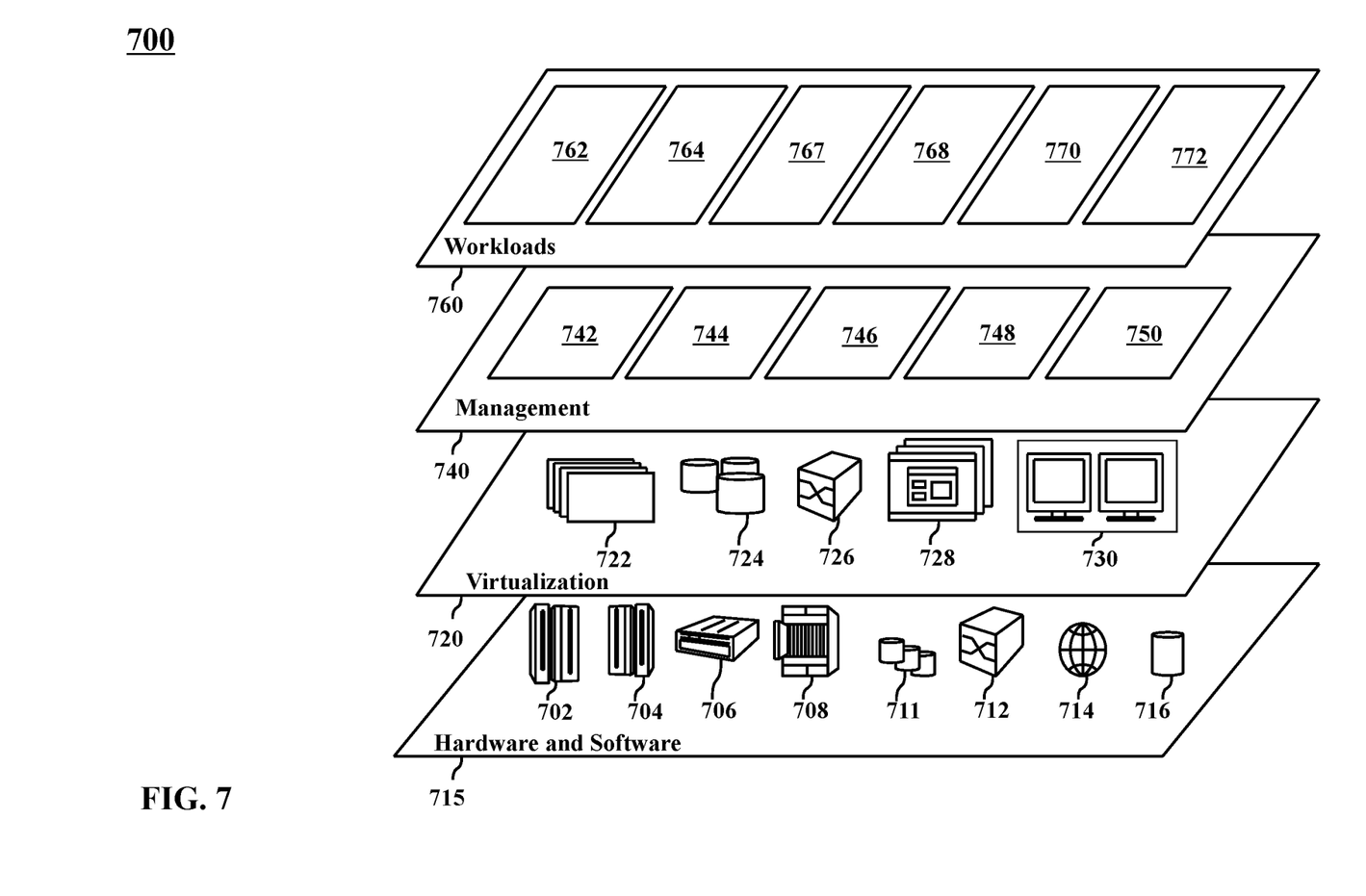
FIG. 7 depicts abstraction model layers of a computing environment, in accordance with embodiments of the present disclosure.

FIG. 7 illustrates abstraction model layers 700 provided by cloud computing environment 610 (FIG. 6) in accordance with embodiments of the present disclosure. It should be understood in advance that the components, layers, and functions shown in FIG. 7 are intended to be illustrative only and embodiments of the disclosure are not limited thereto. As depicted below, the following layers and corresponding functions are provided.

Hardware and software layer 715 includes hardware and software components. Examples of hardware components include: mainframes 702; RISC (Reduced Instruction Set Computer) architecture-based servers 704; servers 706; blade servers 708; storage devices 711; and networks and networking components 712. In some embodiments, software components include network application server software 714 and database software 716.

Virtualization layer 720 provides an abstraction layer from which the following examples of virtual entities may be provided: virtual servers 722; virtual storage 724; virtual networks 726, including virtual private networks; virtual applications and operating systems 728; and virtual clients 730.

In one example, management layer 740 may provide the functions described below. Resource provisioning 742 provides dynamic procurement of computing resources and other resources that are utilized to perform tasks within the cloud computing environment. Metering and pricing 744 provide cost tracking as resources and are utilized within the cloud computing environment as well as billing or invoicing for consumption of these resources. In one example, these resources may include application software licenses. Security provides identity verification for cloud consumers and tasks as well as protection for data and other resources. User portal 746 provides access to the cloud computing environment for consumers and system administrators. Service level management 748 provides cloud computing resource allocation and management such that required service levels are met. Service level agreement (SLA) planning and fulfillment 750 provide pre-arrangement for, and procurement of, cloud computing resources for which a future requirement is anticipated in accordance with an SLA.

Workloads layer 760 provides examples of functionality for which the cloud computing environment may be utilized. Examples of workloads and functions which may be provided from this layer include: mapping and navigation 762; software development and lifecycle management 764; virtual classroom education delivery 766; data analytics processing 768; transaction processing 770; and distributed system workload management 772.

Figure 8:
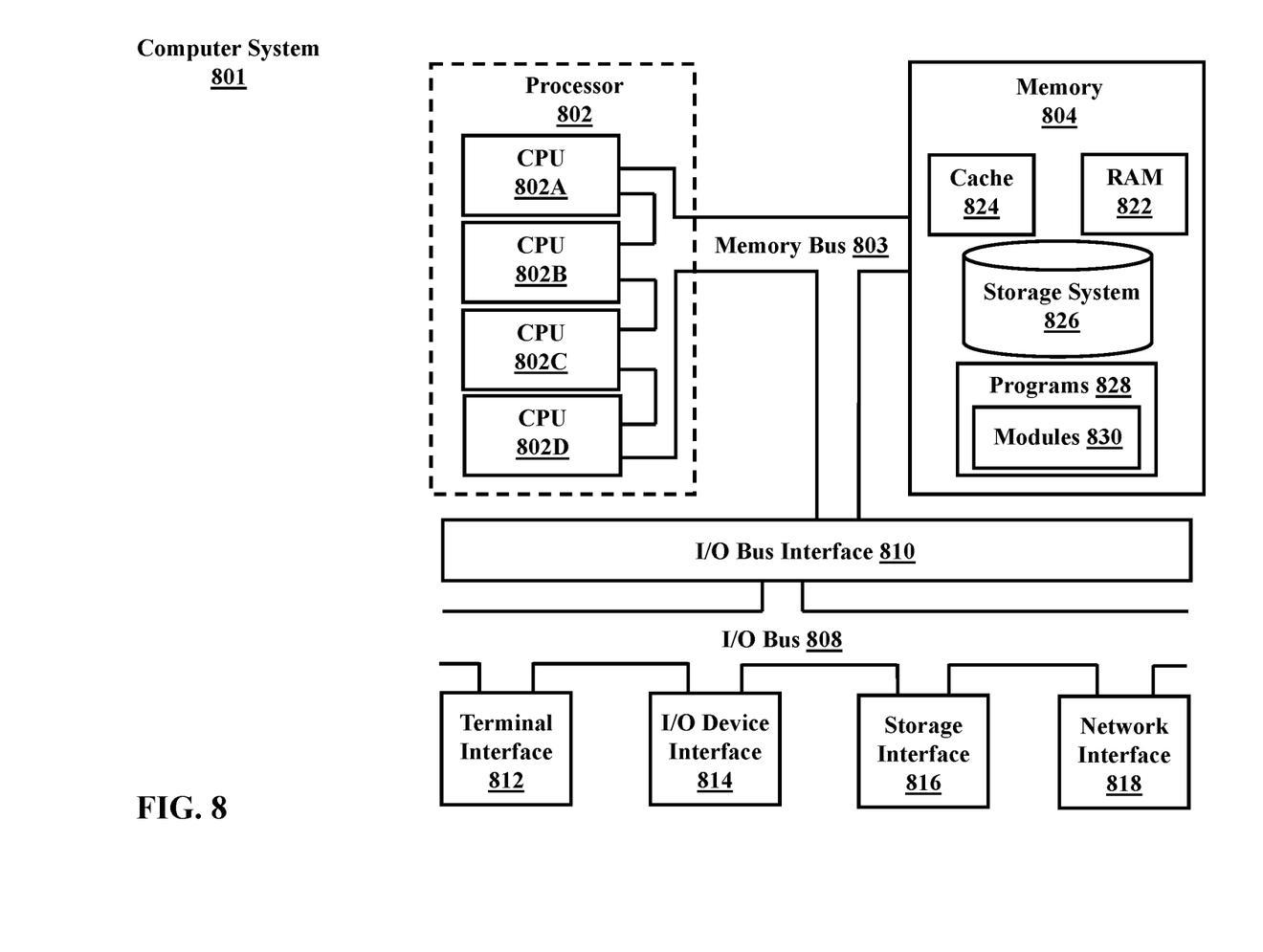
FIG. 8 illustrates a high-level block diagram of an example computer system that may be used in implementing one or more of the methods, tools, and modules, and any related functions, described herein, in accordance with embodiments of the present disclosure.

FIG. 8 illustrates a high-level block diagram of an example computer system 801 that may be used in implementing one or more of the methods, tools, and modules, and any related functions, described herein (e.g., using one or more processor circuits or computer processors of the computer) in accordance with embodiments of the present disclosure. In some embodiments, the major components of the computer system 801 may comprise a processor 802 with one or more central processing units (CPUs) 802A, 802B, 802C, and 802D, a memory subsystem 804, a terminal interface 812, a storage interface 816, an I/O (Input/Output) device interface 814, and a network interface 818, all of which may be communicatively coupled, directly or indirectly, for inter-component communication via a memory bus 803, an I/O bus 808, and an I/O bus interface unit 810.

The computer system 801 may contain one or more general-purpose programmable CPUs 802A, 802B, 802C, and 802D, herein generically referred to as the CPU 802. In some embodiments, the computer system 801 may contain multiple processors typical of a relatively large system; however, in other embodiments, the computer system 801 may alternatively be a single CPU system. Each CPU 802 may execute instructions stored in the memory subsystem 804 and may include one or more levels of on-board cache.

System memory 804 may include computer system readable media in the form of volatile memory, such as random access memory (RAM) 822 or cache memory 824. Computer system 801 may further include other removable/non-removable, volatile/non-volatile computer system storage media. By way of example only, storage system 826 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM, or other optical media can be provided. In addition, memory 804 can include flash memory, e.g., a flash memory stick drive or a flash drive. Memory devices can be connected to memory bus 803 by one or more data media interfaces. The memory 804 may include at least one program product having a set (e.g., at least one) of program modules that are configured to carry out the functions of various embodiments.

One or more programs/utilities 828, each having at least one set of program modules 830, may be stored in memory 804. The programs/utilities 828 may include a hypervisor (also referred to as a virtual machine monitor), one or more operating systems, one or more application programs, other program modules, and program data. Each of the operating systems, one or more application programs, other program modules, and program data, or some combination thereof, may include an implementation of a networking environment. Programs 828 and/or program modules 830 generally perform the functions or methodologies of various embodiments.

Although the memory bus 803 is shown in FIG. 8 as a single bus structure providing a direct communication path among the CPUs 802, the memory subsystem 804, and the I/O bus interface 810, the memory bus 803 may, in some embodiments, include multiple different buses or communication paths, which may be arranged in any of various forms, such as point-to-point links in hierarchical, star, or web configurations, multiple hierarchical buses, parallel and redundant paths, or any other appropriate type of configuration. Furthermore, while the I/O bus interface 810 and the I/O bus 808 are shown as single respective units, the computer system 801 may, in some embodiments, contain multiple I/O bus interface units 810, multiple I/O buses 808, or both. Further, while multiple I/O interface units 810 are shown, which separate the I/O bus 808 from various communications paths running to the various I/O devices, in other embodiments some or all of the I/O devices may be connected directly to one or more system I/O buses 808.

In some embodiments, the computer system 801 may be a multi-user mainframe computer system, a single-user system, a server computer, or similar device that has little or no direct user interface but receives requests from other computer systems (clients). Further, in some embodiments, the computer system 801 may be implemented as a desktop computer, portable computer, laptop or notebook computer, tablet computer, pocket computer, telephone, smartphone, network switches or routers, or any other appropriate type of electronic device.

It is noted that FIG. 8 is intended to depict the representative major components of an exemplary computer system 801. In some embodiments, however, individual components may have greater or lesser complexity than as represented in FIG. 8, components other than or in addition to those shown in FIG. 8 may be present, and the number, type, and configuration of such components may vary.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide, or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN) or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present disclosure has been described in terms of specific embodiments, it is anticipated that alterations and modifications thereof will become apparent to the skilled in the art. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or the technical improvement over technologies found in the marketplace or to enable others of ordinary skill in the art to understand the embodiments disclosed herein. Therefore, it is intended that the following claims be interpreted as covering all such alterations and modifications as fall within the true spirit and scope of the disclosure.

What is claimed is:

1. A system, said system comprising:
a memory; and
a processor in communication with said memory, said processor being configured to perform operations, said operations comprising:
calculating a priority factor with a node autonomous center in a node, wherein said node autonomous center is specific to said node;
computing a node service capability for said node with said node autonomous center in said node;
selecting, with said node autonomous center, a task based on said priority factor and said node service capability; and
directing said task to said node.

2. The system of claim 1, said operations further comprising:
identifying a task type wherein said priority factor is computed based on said task type.

3. The system of claim 1, said operations further comprising:
selecting, dynamically, at least one input for calculating said priority factor.

4. The system of claim 1, said operations further comprising:
predicting a future node service capability with said node autonomous center, wherein said future node service capability is a component of said node service capability.

5. The system of claim 4, said operations further comprising:
analyzing node data with said node autonomous center to predict said future node service capability.

6. The system of claim 1, said operations further comprising:
communicating, by said node, a communication with a centralized module, wherein said centralized module provides said task to said node upon receipt of direction from said node.

7. The system of claim 6, wherein:
said communication is communicated between said node and said centralized module via a label repository.

8. A method, said method comprising:
calculating a priority factor with a node autonomous center in a node, wherein said node autonomous center is specific to said node;
computing a node service capability for said node with said node autonomous center in said node;
selecting, with said node autonomous center, a task based on said priority factor and said node service capability; and
directing said task to said node.

9. The method of claim 8, further comprising:
identifying a task type wherein said priority factor is computed based on said task type.

10. The method of claim 8, further comprising:
choosing, dynamically, at least one input for calculating said priority factor.

11. The method of claim 8, further comprising:
predicting a future node service capability with said node autonomous center, wherein said future node service capability is a component of said node service capability.

12. The method of claim 11, further comprising:
analyzing node data with said node autonomous center to predict said future node service capability.

13. The method of claim 8, further comprising:
communicating, by said node, a communication with a centralized module, wherein said centralized module provides said task to said node upon receipt of direction from said node.

14. The method of claim 13, wherein:
said communication is communicated between said node and said centralized module via a label repository.

15. A computer program product, said computer program product comprising a computer readable storage medium having program instructions embodied therewith, said program instructions executable by a processor to cause said processor to perform a function, said function comprising:
calculating a priority factor with a node autonomous center in a node, wherein said node autonomous center is specific to said node;
computing a node service capability for said node with said node autonomous center in said node;
selecting, with said node autonomous center, a task based on said priority factor and said node service capability; and
directing said task to said node.

16. The computer program product of claim 15, said function further comprising:
identifying a task type wherein said priority factor is computed based on said task type.

17. The computer program product of claim 15, said function further comprising:
choosing, dynamically, at least one input for calculating said priority factor.

18. The computer program product of claim 15, said function further comprising:
predicting a future node service capability with said node autonomous center, wherein said future node service capability is a component of said node service capability.

19. The computer program product of claim 15, said function further comprising:
  communicating, by said node, a communication with a centralized module, wherein said centralized module provides said task to said node upon receipt of direction from said node.

20. The method of claim 19, wherein:
  said communication is communicated between said node and said centralized module via a label repository.

* * * * *